United States Patent [19]

Fedde

[11] 4,041,396
[45] Aug. 9, 1977

[54] ENVIRONMENTALLY SENSITIVE TRANSMIT POWER MAXIMIZING CIRCUITRY AND METHOD

[75] Inventor: Chris Steven Fedde, Palatine, Ill.

[73] Assignee: Motorola, Inc., Schaumburg, Ill.

[21] Appl. No.: 643,215

[22] Filed: Dec. 22, 1975

[51] Int. Cl.² .......................... H04B 1/04; H03F 1/30
[52] U.S. Cl. .................................... 325/150; 325/187;
                    328/11; 330/23; 330/143; 361/106
[58] Field of Search ...................... 325/150, 159, 187;
                    328/3, 11; 330/23, 143; 317/41, 40 R

[56] References Cited
U.S. PATENT DOCUMENTS 2,426,589  9/1947  Bollman .............................. 330/143
3,277,386  10/1966  Miyazawa ........................... 330/143
3,641,451  2/1972  Hollingsworth et al. ............. 330/29

Primary Examiner—Robert L. Griffin
Assistant Examiner—Marc. L. Bookbinder
Attorney, Agent, or Firm—Victor Myer; James W. Gillman

[57] ABSTRACT

In a transmitter designed for periods of extended use, means for sensing the ambient temperature in which the transmitter would operate if activated and adjusting the initial output power of the transmitter so as to reduce the initial output power of the transmitter to maximize or increase the power output above that obtainable using existing protective techniques over an extended period.

4 Claims, 3 Drawing Figures

U.S. Patent     Aug. 9, 1977     4,041,396
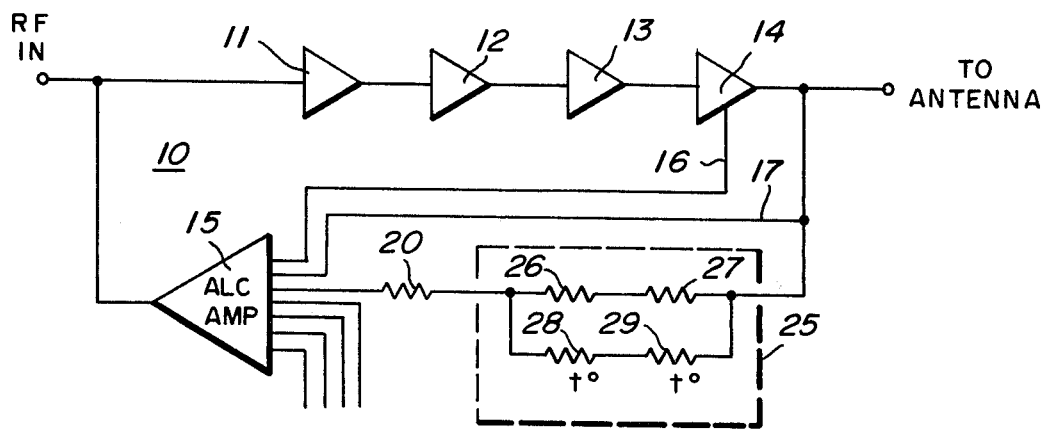
Fig. 1
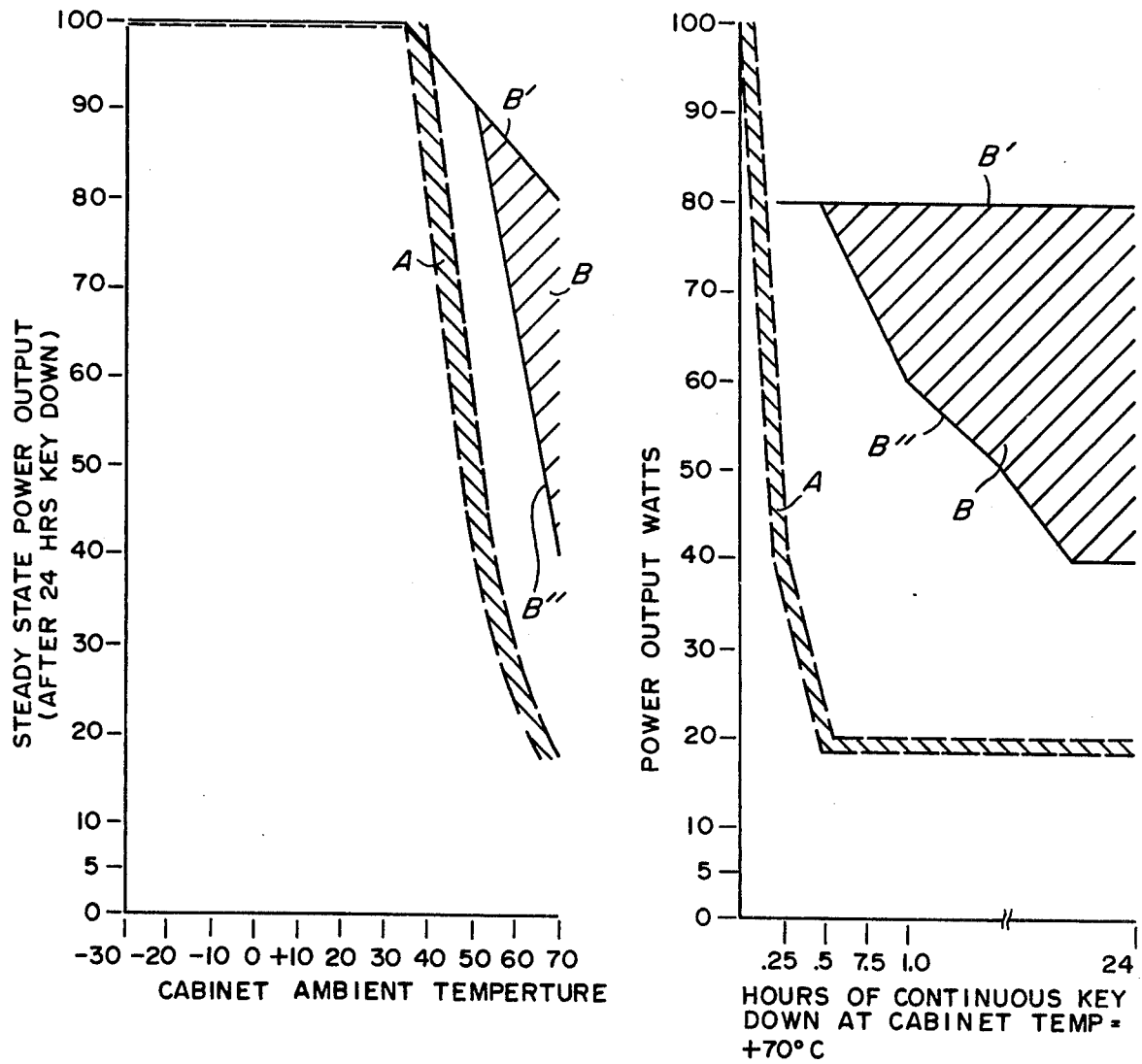
Fig. 2
Fig. 3

ENVIRONMENTALLY SENSITIVE TRANSMIT POWER MAXIMIZING CIRCUITRY AND METHOD

BACKGROUND OF THE INVENTION

In many applications, transmitter may be operated for extended periods of time and, in some instances, even continuously. In such applications the heat of the various components in the transmitters becomes a serious problem. For example, if the power amplifiers of the transmitter have transistors therein, these transistors can generally not withstand more than approximatley 200° C without seriously reducing the life thereof. In many instances, it is not practical or convenient to incorporate means for cooling the transmitter and, therefore, the transmitter must be designed initially to remain below a critical temperature even during continuous operation.

Designing a transmitter so that the heat generated thereby will not cause various components of the transmitter to exceed critical temperatures is extremely difficult. For example, when the antenna becomes mismatched with the transmitter large amounts of reverse power can be generated. Therefore, many transmitters incorporate protection circuits which sense forward and/or reverse power and automatically maintain a constant acceptable power output level. These transmitters also generally include circuitry for sensing the temperature of various critical components, e.g. power output transistors, and reducing the power output of the transmitter when the temperature of these components rises to a critical level. However, this can create a serious problem when the ambient temperature adjacent the transmitter is high. At times when the ambient temperature is high, the transmitter quickly reaches the critical temperatures and cuts back to a point that the transmitter may not produce sufficient power to communicate with the desired receivers.

SUMMARY OF THE INVENTION

The present invention pertains to environmentally sensitive transmit power maximizing circuitry for use in a transmitter designed for periods of extended use including temperature sensitive means having an electrical characteristic which varies in accordance with the temperature thereof mounted in a position remote from heat producing elements of the transmitter so as to sense ambient temperature adjacent to the transmitter and means for connecting said temperature sensitive means to the power amplifier for varying the output of the power amplifier in a predetermined relation to changes in the ambient temperature adjacent to the transmitter.

However, the invention is not in itself a protective circuit, but rather a power maximizing circuit above that obtainable in conventional protective circuits. The invention includes a temperature sensitive means having an electrical characteristic which varies in accordance with the temperature thereof mounted in a position remote from the heat producing elements of the transmitter so as to sense the ambient temperature the transmitter will be required to operate at when activated; and means for connecting the temperature sensitive means to the power amplifier for varying the initial output power of the amplifier in a predetermined relation to its ambient temperature in addition to control provided by existing protective circuits.

It is an object of the present invention to provide new and improved environmentally sensitive transmit power maximizing circuitry for use in a transmitter designed for periods of extended use.

It is a further object of the present invention to provide a transmitter designed for periods of extended use including means for sensing the ambient temperature and varying the initial power output of the transmitter in accordance with the ambient temperature.

These and other objects of the invention will become apparent to those skilled in the art upon consideration of the accompanying specification, claims and drawings.

BRIEF DESCRIPTION OF THE DRAWING

Referring to the drawings:

FIG. 1 is a schematic/block diagram of the power amplifier portion of a transmitter including an embodiment of environmentally sensitive transmit power maximizing circuitry;

FIG. 2 is a graph illustrating steady state power output versus ambient temperature in a transmitter including an environmentally sensitive transmit power maximizing circuit and a prior art transmitter; and FIG. 3 is a graph illustrating power output versus time in a transmitter including environmentally sensitive transmit power maximizing circuitry and a prior art transmitter.

DESCRIPTION OF THE PREFERRED EMBODIMENT

Referring specifically to FIG. 1, a transmitter, generally designated 10, is illustrated which includes four power amplifier stages 11–14 with an rf input to the amplifier 11 from a source not shown and a power output from the amplifier 14 to an antenna which is not shown. The output of the power amplifiers 11–14 is controlled by a feedback circuit including an automatic level control amplifier 15 having an output connected to the input of the first power amplifier 11 and a plurality of inputs including a lead 16 connected to a temperature sensor at the final transistor power amplifier stage 14, and a lead 17 connected to power output detectors (not shown). The temperature sensors in the final amplifier stage and the power output sensors are not illustrated or discussed in this disclosure but a complete description of the operation thereof is disclosed in a co-pending application entitled "PA Protection Circuit For A Single Side Band Radio", Ser. No. 632,542, filed Nov. 17, 1975 in the names of Lurey et al and assigned to the same assignee as the subject invention, now U.S. Pat. No. 4,019,150. It should be understood of course that the number of amplifiers disclosed and the various protection circuits utilized are simply for explanatory purposes and do not form a portion of this invention. The amplifier 15 functions as is well known, for example, as in application Ser. No. 632,542 now U.S. Pat. No. 4,019,150 for the inputs on lines 16 and 17. The four unnumbered leads connected to the amplifier 15 are necessary conductors to complete the sensing circuits as, for example in the Hollingsworth Pat. No. 3,641,451 cited.

The automatic level control amplifier 15 also has an input connected through a resistor 20 to an ambient temperature sensor, generally designated 25. The opposite side of the ambient temperature sensor 25 is connected to the output power detector (not shown but of well known variety as in said application Ser. No. 632,542, now U.S. Pat. No. 4,019,150 or Hollingsworth No. 3,641,451) at the output of the amplifier 14 and serves to modify the feedback supplied to the automatic level control amplifier 15 so as to adjust the initial output of the power amplifiers 11-14 as in said application or Hollingsworth by a voltage developed at the output side of resistor 20. This voltage is applied to the appropriate components in ALC 15 and reduces the power to amplifier 11 as well understood from the references. The power-temperature characteristics are shown in FIGS. 2 and 3. While this embodiment incorporates ambient temperature sensing in series with ALC loops, similar advantage could be realized with this invention if incorporated as a separate input in parallel with existing inputs. The ambient temperature sensor includes a component with an electrical characteristic which varies in accordance with the temperature of the component as for example the resistance of a thermistor and other heat sensitive resistors, the capacitance of certain capacitors, the conductance of certain transistors and other semiconductors, etc. The ambient temperature sensor 25 in this embodiment, includes a pair of resistors 26 and 27 connected in series between the resistor 20 and the output of the power detector and a pair of thermistors 28 and 29 connected in series and in parallel with the series connected resistors 26 and 27. In the present embodiment the resistor 20 has a value of 10 k ohms and the resistor 26 and 27 each have a value of 15 k ohms. The thermistors 28 and 29 have a value of 89 k ohms at 55° C and, as is well known to those skilled in the art, the value of the thermistors decreases as the temperature increases.

In the normal construction of a transmitter, such as transmitter 10, all of the components are mounted within a cabinet and the main heat producing element, e.g. transistors in the final output stage 14, have heat sinks attached thereto. In the present embodiment the ambient temperature sensor 25 is mounted within the cabinet remote from the heat producing elements so that it is sensitive to the ambient temperature within the cabinet and may, for example, be attached to a printed circuit board of the like which will not conduct heat from other components. Thus, temperature sensors, such as those in the final amplifier stage 14 attached to the lead 16, are mounted on the heat sinks of the transistors and control the output of the power amplifiers in accordance with the heat of the final stages. These temperature sensors form a protection circuit and reduce the power to the final stages 14 when the heat sinks indicate that the transistors are about to be over heated. The ambient temperature sensor 25, however, is not a protection circuit but adjusts the initial power output of the power amplifiers 11-14 to maximize the transmit power in accordance with the ambient temperature. As is customary, the temperature sensors of final amplifier stage 14 are critical components in the existing protective circuits and are adjusted to protect at specified critical temperatures. These temperatures are determined in part, by considering the highest dissipation levels which may be encountered during operation and relating this to the corresponding temperatures at the heat sensing points. The subject invention provides a means of adjusting the maximum dissipation levels which may be encountered such that they occur only at ambient temperatures where the heat dissipating capabilities of the means of heat sinking are adequate to protect critical components. The point at which heat sinking is no longer adequate under continuous use and thus protective shutback is necessary, now occurs at lower power levels, thus lower dissipative levels. The temperatures at which the heat sensors need to activate may therefore be raised correspondingly. This yields higher power output levels during extended use. The protective value of the existing techniques remain intact.

With conventional techniques maximum dissipation conditions may occur, specifically upon initial key down, i.e. initial power, for example, even at very high, +70° C, ambient temperatures where the means of heat sinking are inadequate during continuous key down. Employing the invention, the conditions of maximum dissipation may occur only at lower ambient temperatures for example, +40°C due to power reductions at initial key down. At these lower temperatures, the means of heat sinking and heat dissipation are adequate during continuous key down. The point at which the means of heat sinking is no longer adequate under continuous operation under any condition now occurs only at temperatures below 50° C. However, the maximum dissipation level which may be encountered corresponds not to 100 watt levels per conventional techniques, rather at 90, or 80, watt levels. Therefore, the temperatures at which the heat sensors must protect against may be raised according to the lower maximum dissipation levels, without sacrificing protection, while yielding higher power output levels during protective power reduction in extended key down conditions.

Referring specifically to FIG. 2, a graph is illustrated which compares power output to ambient temperature. The outputs of two transmitters, both having a maximum of 100 watts output, after 24 hours of continuous use are illustrated on the graph. The area designated A illustrates the power output of a conventional transmitter not including a power maximizing circuit and it can be seen that after the ambient temperature reaches approximately 35° to 40° C the power output drops off rapidly to less than 20 watts. The area designated B illustrates the power output of a transmitter including a power maximizing circuit with the upper line, designated B,' illustrating the power output of the transmitter when the load is matched and the lower line, designated B", illustrating the output of the transmitter when the load is severely mismatched. It can be seen from the graph in FIG. 2 that both transmitters supply the maximum power up to 35° C, at which temperature the output of the transmitter containing the power maximizing circuit begins to drop at a rate of approximately one half watt or approximately ½ per cent per degree centigrade. Curve B shows a ½ watt per degree centigrade rate of drop which is true for the initial keydown, or turning on of the transmitter, and is also true if the transmitter is matched to the antenna. This is the characteristic of the transmitter when it is controlled by the particular ambient temperature sensing circuitry 25 indicated above and as a result of the circuitry 25 a voltage appears at the output of resistor 20 which causes decreased power at amplifier 11 and thus at the output of amplifier 14. The drop rate is empirically determinable. Other rates of drop could be selected depending upon design criteria. However, if the antenna is mismatched the other protective circuitry begins to function and the output power drops at a faster rate, as shown by the crosshatched area B in FIG. 2. However, the output of the conventional transmitter drops much more rapidly thereafter and, for example, at 60° C ambient temperature, the steady state output of the conventional transmitter is approximately 30 watts while the output of the transmitter containing the power maximizing circuit is approximately 87 watts. Thus, while the ambient temperature sensor operates to limit the initial power output of the transmitter 10, i. e. the power output supplied by the transmitter when it is first turned on, in accordance with the ambient temperature the power supplied by the transmitter after continuous operation remains greater than the power output of the conventional transmitter not including the ambient temperature sensor.

Referring specifically to FIG. 3, a graph is shown which illustrates the power output versus the hours of continuous operation at +70° C cabinet temperature, i.e., ambient, of a conventional transmitter not including a power maximizing circuit and a transmitter including a power maximizing circuit. The area designated A in the graph of FIG. 3 represents the power output versus time of the conventional transmitter which includes only ordinary high temperature protecting circuitry, and the area designated B represents the power output of a transmitter including the power maximizing circuit, with the upper line designated B' indicating the power output with a matched load, the line designated B" indicating the power output with a severely mismatched load, and the area in the middle indicating the power output with loads somewhere therebetween. Thus, with a matching load a transmitter in which the initial output power determined by the ambient temperature sensor 25 is reduced to 80 watts output, in accordance with the present invention, will supply the 80 watts output continuously. However, the power output of a transmitter which initially supplies 100 watts, drops off almost immediately and it is as low as 20 watts within one half hour. Thus, by sensing the ambient temperature and varying the initial power output of the tranmitter in a predetermined relation to the ambient temperature, i.e. reducing the initial power as the ambient temperature rises, a greater amount of power can be transmitted for longer periods of time.

As indicated above, the power-temperature characteristics of FIGS. 2 and 3, particularly the graphs B' and B" are determined empirically. Thus the predetermined relation between initial power output (before power reduction is necessary) and the ambient temperature is determined by continuously decreasing the heat dissipative ability of the heat sinking means with increasing ambient temperature and this led to the rate of 1/2 watt per degree C which was appropriate for the specific application in which the subject invention was applied.

It should be understood that the values provided for the various components of the ambient temperature sensor are for illustrative purposes and are utilized with a transmitter which produces a maximum 100 watts output. Many variations in the exact embodiment and size of the various components will be devised by those skilled in the art for use with different types and sizes of transmitters. Further, other circuitry may be devised for reducing the power output of the transmitter in accordance with the ambient temperature and the present circuitry is simply illustrated as one embodiment thereof.

I claim:

1. Environmentally sensitive transmit power maximizing circuitry for use in a transmitter designed for periods of extended use, said circuitry comprising:
   a. power amplifying means forming a portion of the transmitter and having input, an output heat producing elements and means including a temperature dependent device for protecting said elements against high temperatures;
   b. temperature sensitive means in addition to said temperature dependent device, having an electrical characteristic which varies in accordance with the temperature of said temperature sensitive means;
   c. mounting means for mounting said temperature sensitive means remote from said heat producing elements and said protecting means of the transmitter and in a position to sense ambient temperatures adjacent the transmitter and
   d. connecting means electrically connecting said temperature sensitive means to said power amplifying means and utilizing the temperature variable electrical characteristic for reducing the initial power output of said power amplifying means in a predetermined relation to increase in the ambient temperature adjacent the transmitter.

2. Transmit power maximizing circuitry as claimed in claim 1 wherein the connecting means and the temperature sensitive means cooperate to reduce the initial power output of the power amplifying means approximately one half per cent for each degree centigrade rise in the ambient temperature above approximately 35° C.

3. Transmit power maximizing circuitry as claimed in claim 1 wherein the temperature sensitive means includes at leastt one thermistor.

4. Transmit power maximizing circuitry as claimed in claim 3 wherein the connecting means includes a feedback loop connecting the thermistor between the output and the input of the power amplifying means to increase the feedback and reduce the output of the power amplifying means with increases in ambient temperature.

* * * * *